Nov. 6, 1928.

R. W. WOODBURY

HOISTING DRUM

Filed Aug. 17, 1926

INVENTOR.
Robert W. Woodbury
BY
Philip S. McLean
ATTORNEY

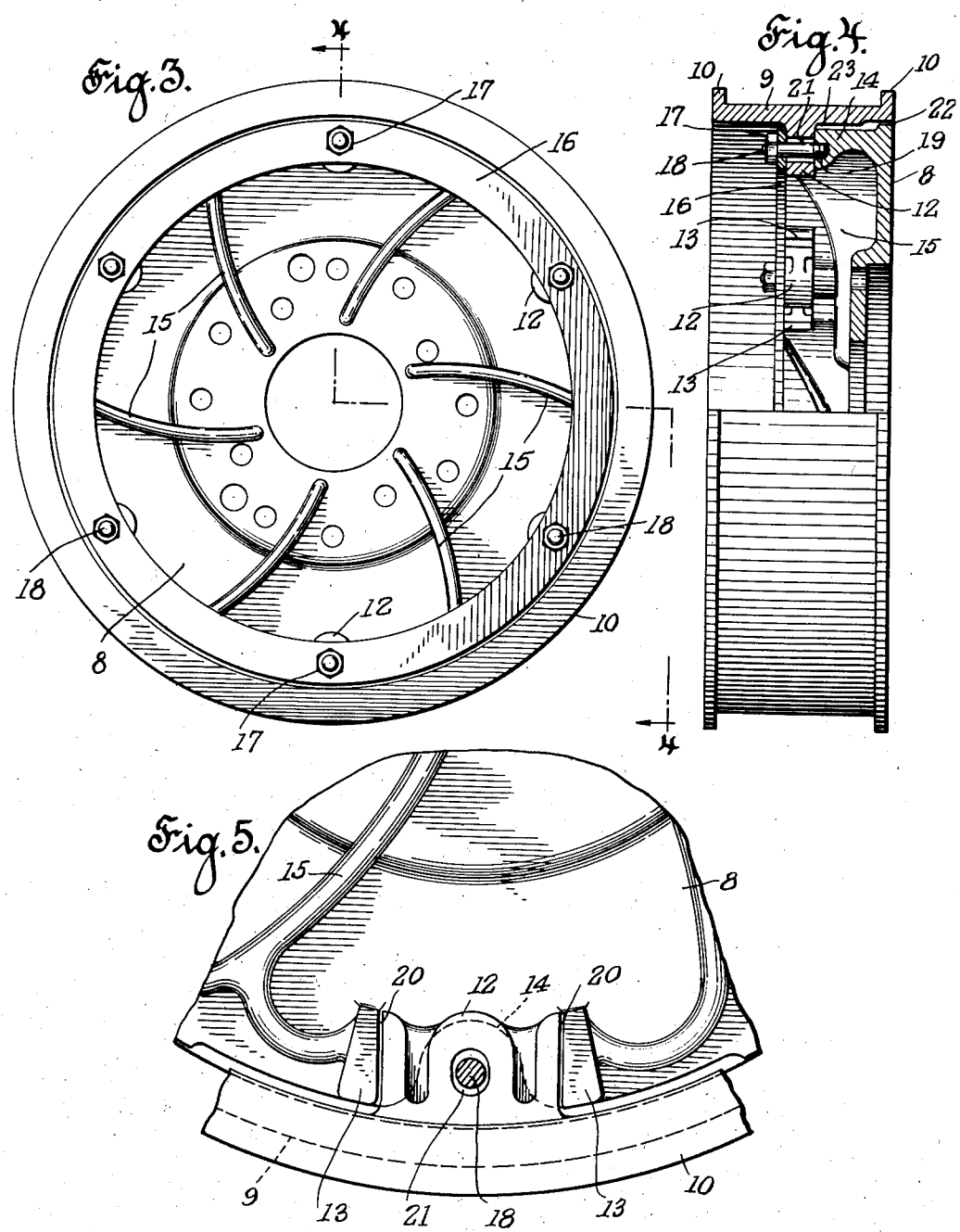

Patented Nov. 6, 1928.

1,690,151

UNITED STATES PATENT OFFICE.

ROBERT W. WOODBURY, OF CHATTANOOGA, TENNESSEE, ASSIGNOR TO LUCEY MANUFACTURING CORPORATION OF TENNESSEE, OF CHATTANOOGA, TENNESSEE, A CORPORATION OF TENNESSEE.

HOISTING DRUM.

Application filed August 17, 1926. Serial No. 129,635.

This invention relates particularly to hoisting drums such as used in the draw works of rotary well drilling outfits. These drums are equipped with brake flanges by which the same are controlled. In drilling to great depths with long strings of pipe, these brake flanges are subjected to heavy and more or less continuous friction, producing excessive heating, resulting frequently in the unequal expansion and cracking of the brake flanges. These fractures are dangerous and the repairs necessitated thereby are expensive and time consuming.

The principal objects of the present invention are to provide a brake flange structure capable of withstanding such friction without overheating and which as it heats up will expand evenly without fracture or injury.

Other objects of the invention are to provide a brake flange of the above desired characteristics which will be readily applicable to the present forms of drums now in use, which will be of simple, sturdy and practical design and which can be readily taken apart and assembled for purposes of renewal or repair.

The foregoing and other desirable objects are attained by certain novel features of construction, combinations and relations of parts as hereinafter definitely described and broadly claimed.

The drawings accompanying and forming part of this specification illustrate one simple practical embodiment of the invention, wherein:

Figure 3 is an end view of one of the brake flanges detached from the drum.

Figure 4 is an edge and part sectional view of the flange structure as taken on substantially the plane of line 4—4 of Figure 3.

Figure 5 is a broken enlarged detail view of the interlocking lugs of the rim and flange proper.

Figure 1:
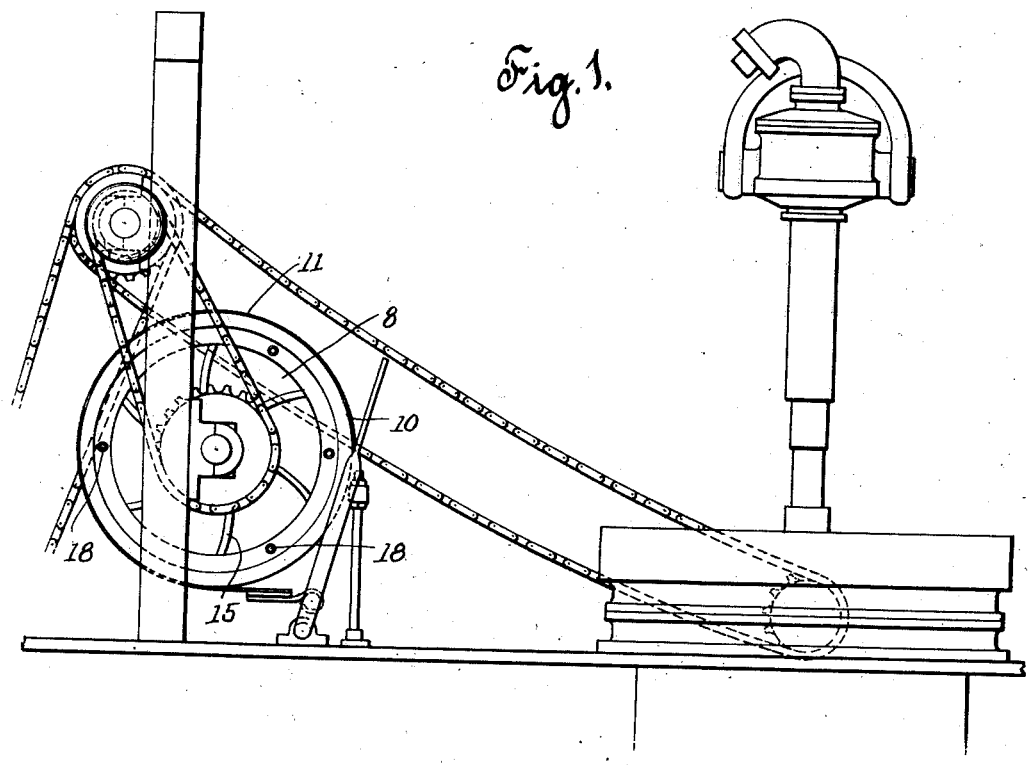
Figure 1 is a side elevation of the drum as in place in the draw works of an ordinary rotary drilling outfit.
Figure 2:
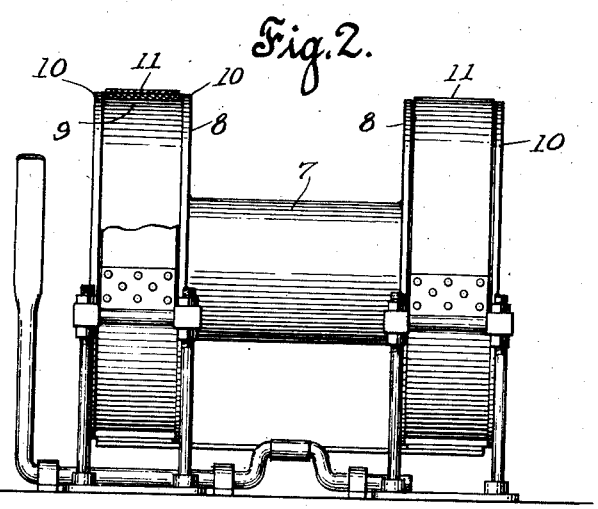
Figure 2 is a front view of the drum, with one of the brake bands broken away to disclose the rim of the brake flange.

As shown in the general views, Figures 1 and 2, the drum is a spool like structure consisting of a cylindrical body portion 7 which carries the cable and to which are bolted the end flanges or heads 8.

The detail views, Figures 3, 4 and 5, show how the end flanges carry separately formed brake rims 9 in the form of relatively wide rings flanged at the edges at 10 to guide the brake bands 11.

These brake rims are detachably and expansively connected with the drum flanges by substantially radially extending lugs 12 at the inner circumference of the same entering between similarly extending properly spaced lugs 13 on the flanges. The latter lugs are shown as formed in and carried by a circumferential wall or rim 14 on the back of the end flange, this wall being reinforced by spoke like webs 15 extending out across the face of the flange and the inner side of wall 14.

The brake rim is held interlocked with the flange by a guard ring 16 overstanding the interfitting lugs of the flange and rim and secured to the flange by nuts 17 on the stud bolts 18. As shown in Figures 4 and 5 these stud bolts are secured in screw seats 19 in the circumferential wall 14 at the back of the pockets 20, which receive the rim lugs. The rim lugs are shown as radially slotted at 21 to fit loosely over these bolts and the opposed faces of the rim lugs and the flange lugs 12, 13 are shown as substantially parallel. This construction, therefore, as will be clear from Figure 5, permits expansive and contractive movements of the rim without injury or strain of either the rim or the flange.

To center the rim on the flange these parts are machined to fit with a slight clearance at 22 between the periphery of the flange and the inner edge of the rim. This fit is such as to afford a guide for the rim in assembling and does not interfere with expansion and contraction of the rim independently of the flange.

The rim and flange are assembled by bringing the lugs on the rim and the pockets on the flange into register and then telescopically shifting the two so as to seat the rim lugs fully in the pockets provided between the flange lugs, the stud bolts assisting in this operation by acting as guides and the machined joint at 22 between the periphery of the flange and the inside edge of the rim assuring proper centering of the two. The parts may then be secured in this interlocked centered relation by slipping the guard ring over the stud bolts and engaging the nuts on the bolts over the ring. The rim is as easily removed by the simple reversal of these operations. The removal of the guard ring exposes all the lugs and permits inspection of the same, without shifting the rim from its seat on the flange.

The rim may be made of the same or different material from the flange since it is free to expand or contract independently of the latter and therefore desired long-wearing frictional qualities of the one may be combined with rigidity and strength in the other. The spacing of the rim from the circumferential shoulder of the flange at 23 insulates the rim from the flange to a certain extent, assists in the radiation of heat from the rim and prevents conduction of heat inwardly to the flange. The fact that the rim can be removed so readily also permits the rim being made of more expensive material than would otherwise be practicable because as it wears it may be readily removed, trued up and restored to use again. Being in the form of a true annulus, the expansion and contraction of the brake rim is symmetrical and the rim therefore retains its concentricity under all conditions.

Only one use and embodiment of the invention has been illustrated in the present disclosure but it should be understood that the device may be put to other uses than that shown and that the structure may be modified without departure from the broad spirit and scope of the claims and it should be understood furthermore, that the terms employed herein are used in a descriptive rather than in a limiting sense, except for such limitations as may be imposed by the state of the prior art.

What is claimed is:

1. A hoisting drum having removable end flanges and annular circumferentially continuous brake rims removably connected with said removable end flanges, said continuous brake rims being expansible and contractible radially and circumferentially independently of said end flanges.

2. A hoisting drum having end flanges forming the cable confining heads of the drum and annular circumferentially continuous brake rims structurally independent of said end flanges and connected therewith by joints enabling expansion and contraction of the rims radially and circumferentially independently of said flanges.

3. A hoisting drum, an end flange for said drum having an annular shoulder with pockets therein and an annular brake rim having internal lugs positioned to enter said pockets, the flange and rim having cooperating parts for loosely centering one with respect to the other.

4. A hoisting drum, an end flange for said drum having an annular shoulder with pockets therein and an annular brake rim having internal lugs positioned to enter said pockets, the lugs of the rim being perforated, securing bolts attached to the flange and extending freely through said perforations, a guard ring at the outer side of and overstanding said lugs and pockets and means on the bolts securing said guard ring in such relation.

5. A hoisting drum end flange having shoulders at the outer side of the same, an annular circumferentially continuous brake rim having internal shoulders to cooperate with the side shoulders of the flange and means for securing said rim with the shoulders of the same engaged with the shoulders of the flange, said continuous rim, except for said securing means being free for both radial and continuous annular expansion.

6. A hoisting drum end flange having spaced lugs at the outer side of the same, an annular brake rim having lugs inside the same adapted to enter between the side lugs of the end flange and means for removably securing said parts thus engaged, including a ring within the rim and overstanding said relatively engaged lugs, and bolts for fastening said ring in place.

7. A hoisting drum end flange having spaced lugs at the outer side of the same, an annular brake rim having lugs inside the same adapted to enter between the side lugs of the end flange and means for removably securing said parts thus engaged, including a ring within the rim and overstanding said relatively engaged lugs, and bolts for fastening said ring in place, the rim lugs having enlarged openings therethrough for the free passage of said bolts.

8. A hoisting drum end flange provided with a peripheral centering shoulder and having an annular wall with side seats therein, an annular brake rim finished to engage said centering shoulder in the telescopic movement of one relative to the other, drive lugs on the inside of said brake rim adapted to enter said seats in the relative telescopic engagement aforesaid, the body of said rim being separated from said annular wall by an air space and means for securing said parts in assembled relation.

9. A hoisting drum end flange provided with a peripheral centering shoulder and having an annular wall with side seats therein, an annular brake rim finished to engage said centering shoulder in the telescopic movement of one relative to the other, drive lugs on the inside of said brake rim adapted to enter said seats in the relative telescopic engagement aforesaid, the body of said rim being separated from said annular wall by an air space and means for securing said parts in assembled relation, including bolts anchored in the annular wall of the flange at the back of said seats, the rim lugs having enlarged openings for free passage of said bolts, a guard ring engaged on said bolts over the rim lugs and fastening nuts on the bolts over said guard ring.

10. A hoisting drum end flange having drive lugs at the outer side of the same, a separately formed annular brake rim having lugs inside the same for driven engagement with the lugs of the flange and means for securing the rim to the flange adapted to permit movement of the rim lugs over the drive lugs in the expansive and contractive shifting of the rim with respect to the flange.

11. A hoisting drum end flange having drive lugs at the outer side of the same, a separately formed annular brake rim having lugs inside the same for driven engagement with the lugs of the flange and means for securing the rim to the flange adapted to permit movement of the rim lugs over the drive lugs in the expansive and contractive shifting of the rim with respect to the flange, the rim and flange having cooperative parts for initially centering one with respect to the other.

12. A hoisting drum end flange and a separately formed annular brake rim, said flange having means at the outer side of the same and the rim having means inside the same cooperating upon relative axial movement of the rim and flange to interlock one with respect to the other, said interlocking means providing a driving connection between the flange and rim and adapted to permit expansive and contractive movements of the rim with respect to the flange and means for securing the rim detachably interlocked with the flange.

13. A hoisting drum end flange having a centering shoulder at the inside edge portion of the same and an annular wall projecting laterally therefrom to the outside of the flange, said annular wall having drive shoulders at the outer edge of the same, a separately formed annular brake rim, having shoulders at the inner circumference of the same to engage said drive shoulders upon axial engaging movement of the rim and flange, a guard ring within the rim and overstanding the cooperating shoulders and means for securing said guard ring in place without restraining movement of the rim shoulders over the flange shoulders, resulting from expansive and contractive efforts of the rim.

14. In combination with the end head of a hoisting drum, a separately formed circumferentially continuous annular brake rim carried by said end head and keyed thereto by joints permitting radial and continuous annular expansion of the same independently of the end head, said continuous brake rim having its outer peripheral portion free and unconfined by the end head and a centering shoulder on the end head within the continuous brake rim.

15. In combination with the end head of a hoisting drum, a separately formed circumferentially continuous annular brake rim carried by said end head and keyed thereto by joints permitting radial and continuous annular expansion of the same independently of the end head, said continuous brake rim having its outer peripheral portion free and unconfined by the end head, bolts within the brake rim member securing the same to the end head member, one of said members having clearance for said bolts to prevent the latter from interfering with the expansive movements of the brake rim.

16. Apparatus of the character herein disclosed comprising a flange provided with lugs on one side of the same, a structurally separate circumferentially continuous annular rim having lugs inside the same engaging the side lugs of the flange, a guard ring overlying said engaging lugs within the rim and means for removably securing said guard ring in place.

17. Apparatus of the character herein disclosed comprising a flange provided with lugs on one side of the same, a structurally separate circumferentially continuous annular rim having lugs inside the same engaging the side lugs of the flange, bolts for securing the rim in place, said bolts extending through the rim lugs and said rim lugs having oversize openings for said bolts enabling radial expansive movements of the rim relative to the flange.

18. Apparatus of the character herein disclosed comprising a flange provided with lugs on one side of the same, a structurally separate circumferentially continuous annular rim having lugs inside the same engaging the side lugs of the flange, the outer faces of said engaging lugs being substantially flush and means overlying said substantially flush outer faces of the engaged lugs to secure the same in engagement.

In witness whereof, I have hereunto set my hand this 12th day of August, 1926.

ROBERT W. WOODBURY.